United States Patent
Liao et al.

(10) Patent No.: US 10,496,549 B2
(45) Date of Patent: Dec. 3, 2019

(54) MEMORY MANAGE METHOD AND STORAGE CONTROLLER USING THE SAME

(71) Applicant: Shenzhen EpoStar Electronics Limited CO., Shenzhen (CN)

(72) Inventors: Shih-Tien Liao, Hsinchu (TW); Yu-Hua Hsiao, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 15/993,610

(22) Filed: May 31, 2018

(65) Prior Publication Data
US 2019/0243774 A1    Aug. 8, 2019

(30) Foreign Application Priority Data
Feb. 5, 2018    (TW) .............................. 107103917 A

(51) Int. Cl.
*G06F 12/10*     (2016.01)

(52) U.S. Cl.
CPC ........ *G06F 12/10* (2013.01); *G06F 2212/654* (2013.01)

(58) Field of Classification Search
CPC ............... G06F 12/10; G06F 2212/654; G06F 11/1469; G06F 11/1147; G06F 11/1456; G06F 11/1448; G06F 11/1446; G06F 11/1458
See application file for complete search history.

(56) References Cited

U.S. PATENT DOCUMENTS

| | | | |
|---|---|---|---|
| 10,198,321 B1 * | 2/2019 | Gordon | .............. G06F 11/1448 |
| 2016/0049968 A1 * | 2/2016 | Kang | .................... H04B 1/126 |
| | | | 455/114.2 |

* cited by examiner

*Primary Examiner* — Hiep T Nguyen
(74) *Attorney, Agent, or Firm* — JCIPRNET

(57) ABSTRACT

A memory management method and a storage controller using the same are provided. The memory management method includes: establishing an array; selecting a first block from spare blocks at an initial time point and storing a first index number of the first block to a look-ahead block; adding the first index number in the look-ahead block to the array at a first time point, selecting a second block from the spare blocks and replacing the first index number stored to the look-ahead block with a second index number of the second block, and programming the first block; and adding the second index number in the look-ahead block to the array at a second time point, selecting a third block from the spare blocks and replacing the second index number in the look-ahead block with a third index number of the third block, and programming the second block.

10 Claims, 3 Drawing Sheets

MEMORY MANAGE METHOD AND STORAGE CONTROLLER USING THE SAME

CROSS-REFERENCE TO RELATED APPLICATION

This application claims the priority benefit of Taiwan application serial no. 107103917, filed on Feb. 5, 2018. The entirety of the above-mentioned patent application is hereby incorporated by reference herein and made a part of this specification.

BACKGROUND OF THE INVENTION

1. Field of the Invention

The invention relates to a memory management method and a storage controller using the same. More particularly, the invention relates to a memory management method capable of improving data recovery capabilities when unexpected power-off occurs and a storage controller using the same.

2. Description of Related Art

Generally, a logical to physical address mapping table is stored before a memory storage device is powered off. After power is restored in the memory storage device, a controller determines that whether the previous power-off belongs to normal power-off (or safe power-off) or belongs to abnormal power-off (sudden power-off). If the previous power-off is determined to be normal power-off, the memory storage device then reads the latest logical to physical address mapping table from the rewritable non-volatile memory storage module. If the previous power-off belongs to abnormal power-off, in addition to reading the latest logical to physical address mapping table, the controller further reads all info nation on the logical block address (LBA) of the block configured for storing the user data after the latest logical to physical address mapping table is stored and updates the physical address of the block to the logical to physical address mapping table. Nevertheless, the controller has to read block numbers of all of the blocks of the memory storage device for obtaining the information on the logical block address, which takes a considerable amount of time. Therefore, how to rapidly recover the logical to physical address mapping table after abnormal power-off occurs is an important goal for those skilled in the art.

SUMMARY OF THE INVENTION

The invention provides a memory management method and a storage controller using the same in which user data is rapidly recovered after abnormal power-off occurs in the memory storage device.

In an embodiment of the invention, a memory management method is provided, and the memory management method includes the following steps. An array is established, wherein the array is null at an initial time point. A first block is selected from a plurality of spare blocks at the initial time point, and a first index number of the first block is stored to a look-ahead block. The first index number in the look-ahead block is added to the array at a first time point. A second block is selected from the spare blocks, and the first index number stored to the look-ahead block is replaced with a second index number of the second block. The first block is programmed starting from the first time point. The second index number in the look-ahead block is added to the array at the second time point. A third block is selected from the spare blocks, and the second index number stored to the look-ahead block is replaced with a third index number of the third block. The second block is programmed starting from the second time point.

In an embodiment of the invention, if abnormal power-off occurs after the second time point and before the first index number and the second index number of the array are written into a physical block corresponding to the array and the third index number is written into a physical block corresponding to the look-ahead block, data is recovered according to the first index number in the physical block corresponding to the array and the second index number in the physical block corresponding to the look-ahead block after power is restored.

In an embodiment of the invention, the step of adding the first index number in the look-ahead block to the array at the first time point includes the following step. The first index number is stored to a first element of the array, and the array having the first index number is stored to a first page of the physical block corresponding to the array. The step of adding the second index number in the look-ahead block to the array at the second time point includes the following step. The second index number is stored to a second element of the array, and the array having the first index number and the second index number is stored to a second page of the physical block corresponding to the array.

In an embodiment of the invention, all physical pages of the first block are programmed in a time interval between the first time point and the second time point.

In an embodiment of the invention, the first time point is later than the initial time point, and the second time point is later than the first time point.

In an embodiment of the invention, a storage controller is provided, and the storage controller is configured for accessing a rewritable non-volatile memory module and is coupled to a host system through a connection interface circuit. The storage controller includes a memory interface control circuit configured for being coupled to the rewritable non-volatile memory module, wherein the rewritable non-volatile memory module includes a plurality of physical blocks. The storage controller includes a processor coupled to the connection interface circuit and the memory interface control circuit. The storage controller further includes a data transfer management circuit coupled to the processor, the connection interface circuit, and the memory interface control circuit. The processor establishes an array, and the array is null at an initial time point. A first block is selected from a plurality of spare blocks at the initial time point, and a first index number of the first block is stored to a look-ahead block. The first index number in the look-ahead block is added to the array at a first time point. A second block is selected from the spare blocks, and the first index number stored to the look-ahead block is replaced with a second index number of the second block. The first block is programmed starting from the first time point. The second index number in the look-ahead block is added to the array at the second time point. A third block is selected from the spare blocks, and the second index number stored to the look-ahead block is replaced with a third index number of the third block. The second block is programmed starting from the second time point.

In an embodiment of the invention, if abnormal power-off occurs after the second time point and before the first index number and the second index number of the array are written into a physical block corresponding to the array and the third index number is written into a physical block corresponding to the look-ahead block, the processor recovers data according to the first index number in the physical block corresponding to the array and the second index number in the physical block corresponding to the look-ahead block after power is restored.

In an embodiment of the invention, the processor stores the first index number to a first element of the array and stores the array having the first index number to a first page of the physical block corresponding to the array. The processor stores the second index number to a second element of the array and stores the array having the first index number and the second index number to a second page of the physical block corresponding to the array.

In an embodiment of the invention, all physical pages of the first block are programmed in a time interval between the first time point and the second time point.

In an embodiment of the invention, the first time point is later than the initial time point, and the second time point is later than the first time point.

To sum up, in the memory management method and the storage controller using the same provided by the embodiments of the invention, the index number of the block to be programmed in the time interval between the first time point and the second time point is added to one array at the first time point. Further, the index number of the block to be programmed at the second time point is recorded in one look-ahead block at the first time point. In this way, even though abnormal power-off occurs after the first time point and the latest array data of the first time point and the data of the look-ahead block are not written into the physical block yet, the controller may still recover the user data according to the array data of the time point prior to the first time point and the data of the look-ahead block without reading the block numbers of all of the blocks.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
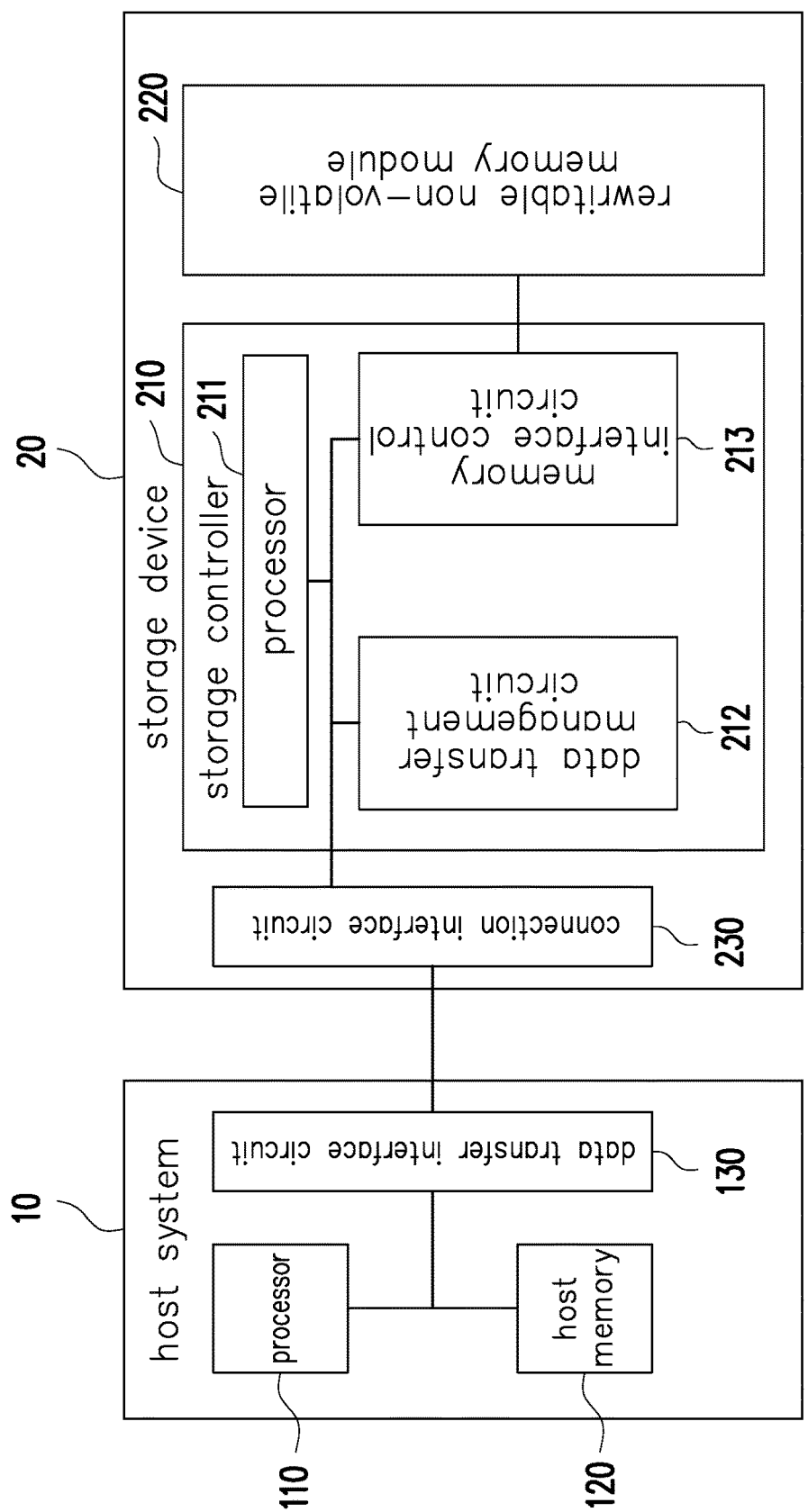
FIG. 1 is a block schematic diagram illustrating a host system and a storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Generally, a storage device includes a rewritable non-volatile memory module and a storage device controller (also known as storage controller or storage control circuit). The storage device is usually used together with a host system so the host system may write data into or read data from the storage device.

FIG. 1 is a block schematic diagram illustrating a host system and a storage device according to an embodiment of the invention.

With reference to FIG. 1, a host system 10 includes a processor 110, a host memory 120, and a data transfer interface circuit 130. The data transfer interface circuit 130 is coupled to (or, electrically connected to) the processor 110 and the host memory 120 in this embodiment. The processor 110, the host memory 120, and the data transfer interface circuit 130 are coupled to one another by utilizing a system bus in another embodiment.

A storage device 20 includes a storage controller 210, a rewritable non-volatile memory module 220, and a connection interface circuit 230. Among them, the storage controller 210 includes a processor 211, a data transfer management circuit 212, and a memory interface control circuit 213.

In this embodiment, the host system 10 is coupled to the storage device 20 through the data transfer interface circuit 130 and the connection interface circuit 230 of the storage device 20 to perform a data access operation. For instance, the host system 10 may store data to the storage device 20 or read data from the storage device 20 through the data transfer interface circuit 130.

The processor 110, the host memory 120, and the data transfer interface circuit 130 may be disposed on a main board of the host system 10 in this embodiment. A number of the data transfer interface circuit 130 may be one or more. The main board may be coupled to the storage device 20 in a wired manner or a wireless manner through the data transfer interface circuit 130. The storage device 20 may be, for example, a flash drive, a memory card, a solid state drive (SSD), or a wireless memory storage device. The wireless memory storage device may be, for example, a memory storage device based on various wireless communication technologies, such as a near field communication (NFC) memory storage device, a wireless fidelity (WiFi) memory storage device, a Bluetooth memory storage device, or a low energy Bluetooth memory storage device (e.g., iBeacon). Further, the main board 20 may also be coupled to various I/O devices including a global positioning system (GPS) module, a network interface card, a wireless transmission device, a keyboard, a monitor, and a speaker through the system bus.

In this embodiment, the data transfer interface circuit 130 and the connection interface circuit 230 are interface circuits compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the invention is not limited thereto. The data transfer interface circuit 130 and the connection interface circuit 230 may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, the connection interface circuit 230 and the storage controller 210 may be packaged into one chip, or the connection interface circuit 230 is distributed outside of a chip containing the storage controller 210 in another embodiment.

The host memory 120 is configured to temporarily store commands executed by the processor 110 or data in this embodiment. For instance, the host memory 120 may be a dynamic random access memory (DRAM), a static random access memory (SRAM), and the like in this embodiment. Nevertheless, it should be understood that the invention is not limited thereto, and the host memory 120 may also be other appropriate memories. To be more specific, the host memory 120 is divided into a plurality of memory pages to be used in a storage management of the commands and the data. Each of the memory pages has a starting address (Starting Address of Memory Page; SAMP) and an ending address (Ending Address of Memory Page; EAMP). In this embodiment, each of the memory pages is addressed by utilizing a 16-bit address. For instance, the starting address (SAMP) of a foremost memory page being sorted may be set as "0x0000", and the ending address (EAMP) thereof may set as "0x0FFF". A size of each of the memory pages is 4096 bytes (i.e., 4 KB). A total space of the memory pages used for the data transfer by the host memory is 64 KB (i.e., 16 memory pages in total). However, the invention is not intended to limit an addressing scheme for the host memory. For example, in another embodiment, the host memory may include more or less space and may correspondingly perform the addressing scheme with use of a proper addressing method.

The storage controller 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It is noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements, which are not particularly limited by the invention.

In an embodiment, the storage controller 210 further includes a ROM (not illustrated) and a RAM (not illustrated). More particularly, the ROM has a boot code, which is executed by the processor 221 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In this embodiment, as described above, the storage controller 210 further includes the data transfer management circuit 212 and the memory interface control circuit 213.

Among them, the data transfer management circuit 212 is coupled to the processor 211, the memory interface control circuit 213 and the connection interface circuit 230. The data transfer management circuit 212 is configured to receive instruction of the processor 211 to perform the data transfer. For example, the data may be read from host system 10 (e.g., the host memory 120) through the connection interface circuit 230, and the read data may be written into the rewritable non-volatile memory module 220 through the memory interface control circuit 213. As another example, the data may be read from the rewritable non-volatile memory module 220 through the memory interface control circuit 213, and the read data may be written into the host system 10 (e.g., the host memory 120) through the connection interface circuit 230. Functions of the data transfer management circuit 212 in the invention are described in more detail with reference to various drawings and embodiments.

The memory interface control circuit 213 is configured to receive instruction of the processor 211 and perform data writing (or, programming) and reading operations for the rewritable non-volatile memory module 220 together with the data transfer management circuit 212. The memory interface control circuit 213 may also perform an erasing operation for the rewritable non-volatile memory module 220.

For instance, the processor 211 may execute a write command sequence to instruct the memory interface control circuit 213 to write the data into the rewritable non-volatile memory module 220; the processor 211 may execute a read command sequence to instruct the memory interface control circuit 213 to read the data from the rewritable non-volatile memory module 220; the processor 211 may execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding operations of writing, reading and erasing for the rewritable non-volatile memory module 220. In an embodiment, the processor 211 may further give other command sequences to the memory interface control circuit 213 in order to perform the corresponding operations for the rewritable non-volatile memory module 220.

In addition, data to be written to the rewritable non-volatile memory module 220 is converted into a format acceptable by the rewritable non-volatile memory module 220 through the memory interface control circuit 213. Specifically, when the processor 211 intends to access the rewritable non-volatile memory module 220, the processor 211 sends the corresponding command sequences to the memory interface control circuit 213 in order to instruct the memory interface control circuit 213 to perform the corresponding operations. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). The command sequences may include one or more signals or data on the bus. The signals or the data may include command codes and program codes. For example, information such as identification codes and memory addresses are included in the read command sequence.

In this embodiment, the memory interface control circuit 213 further identifies states of logical blocks assigned to the rewritable non-volatile memory module 220. The memory interface control circuit 213 may also identify states of physical blocks of the rewritable non-volatile memory module 220. More specifically, after the memory interface control circuit 213 sends read/write requests to the rewritable non-volatile memory module 220 according to read/write commands, the memory interface control circuit 213 identifies whether a state of the storage unit (e.g., the physical block or a physical page, or the corresponding logical block or a logical page) of the rewritable non-volatile memory module 220 is a readiness state. For instance, when the memory interface control circuit 213 identifies that the physical blocks corresponding to the read/write commands are ready for the data transfer, the memory interface control circuit 213 can send a state report indicating that the logical block mapped to the physical block is in the readiness state. In other words, the memory interface control circuit 213 determines whether the state of the logical block is the readiness state by determining whether the physical blocks mapped by the logical block is ready for the data transfer. The memory interface control circuit 213 can actively determine whether the state of the corresponding physical block is ready for the data transfer, and may also passively receive the state report of the corresponding physical block from the rewritable non-volatile memory module 220. The invention is not intended to limit how the memory interface control circuit 213 identifies whether the physical block/logical block for the data access is in the readiness state.

The rewritable non-volatile memory module 220 is coupled to the storage controller 210 and configured to store data written from the host system 10. The rewritable non-volatile memory module 220 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features. The memory cells in the rewritable non-volatile memory module 220 are disposed in an array.

In this embodiment, the memory cells of the rewritable non-volatile memory module 220 can constitute a plurality of physical programming units, and the physical programming units can constitute a plurality of physical blocks (also known as physical erasing units). Specifically, the memory cells on the same word line (or the same word line layer) can constitute one or more of the physical programming units. If each of the memory cells may be used to store two or more bits, the physical programming units on the same word line (or the same word line layer) may be at least classified into one lower physical programming unit and one upper physical programming unit.

In an embodiment, if each of the memory cells may be used to store two bits, the physical programming units on the same word line (or the same word line layer) may be classified into one lower physical programming unit and one upper physical programming unit. For instance, a least significant bit (LSB) of one memory cell belongs to the lower physical programming unit, and a most significant bit (MSB) of one memory cell belongs to the upper physical programming unit. Generally, a writing speed of the lower physical programming unit is higher than a writing speed of the upper physical programming unit, and/or a reliability of the lower physical programming unit is higher than a reliability of the upper physical programming unit. In an embodiment, if each of the memory cells may be used to store three bits, the physical programming units on the same word line (or the same word line layer) may be classified into one lower physical programming unit, one upper physical programming unit and one extra physical programming unit. For example, a least significant bit (LSB) one memory cell belongs to the lower physical programming unit, a center significant bit (CSB) of one memory cell belongs to the upper physical programming unit, and a most significant bit (MSB) of one memory cell belongs to the extra physical programming unit.

In the present embodiment, the storage unit used for writing (programming) the data is the physical block. The physical block may also be referred to as the physical erasing unit or a physical unit. The physical erasing unit is the minimal unit for erasing. Namely, each physical erasing unit contains the least number of memory cells to be erased together. Each of the physical blocks has a plurality of physical programming units. The physical programming unit is the physical page or a physical sector. When the physical programming units are the physical pages, the physical programming units usually include a data bit area and a redundancy bit area. The data bit area includes multiple physical sectors configured to store user data, and the redundant bit area is configured to store system data (e.g., an error correcting code).

However, the invention is not limited thereto. For example, in another embodiment, the data transfer method described in the present embodiment may also be modified and applied to the rewritable non-volatile memory module 220 with the storage unit being the physical programming unit as a unit for writing data.

In an embodiment, the storage controller 210 manages the memory cells in the rewritable non-volatile memory module 220 based on the physical unit. For example, in the following embodiments, examples in which one physical block serves as one physical unit are provided. However, in another embodiment, one physical unit may also refer to a composition with any number of memory cells, depending on practical requirements. Further, it should be understood that, when the storage controller 211 groups the memory cells (or the physical units) in the rewritable non-volatile memory module 220 for the corresponding management operations, the memory cells (or the physical units) are logically grouped but their actual locations are not changed.

The storage controller 210 assigns a plurality of logical units for mapping to a plurality of physical units of the rewritable non-volatile memory module 220 for storing the user data, and the host system 10 accesses the user data stored in the physical units for storing the user data through the logical units. Herein, each of the logical units may be constituted by one or more logic addresses. For example, the logic unit may be a logical block, a logical page or a logical sector. One logical unit may be mapped to one or more physical units, where the physical unit may be one or more physical addresses, one or more physical sectors, one or more physical programming units, or one or more physical erasing units. In the present embodiment, the logical unit is the logical block.

For instance, the storage controller 210 establishes a logical to physical address mapping table and a physical to logical address mapping table to record a mapping relation between the logical unit (e.g., the logical block, the logical page or the logical sector) assigned to the rewritable non-volatile memory module 220 and the physical unit (e.g., the physical erasing unit, the physical programming unit or the physical sector). In other words, the storage controller 210 may look up for the physical unit mapped to one logical unit by using the logical to physical address mapping table, and the storage controller 210 may look up for the logical unit mapped to one physical unit by using the physical to logical address mapping table. Nonetheless, the technical concept for the mapping relation between the logical unit and the physical unit is a well-known technical means in the field, which is not repeated hereinafter.

In an embodiment, the storage controller 210 further includes a buffer memory (not illustrated) and a power management circuit (not illustrated). The buffer memory is coupled to the processor 211 and configured to temporarily store data and commands from the host system 10, data from the rewritable non-volatile memory module 220, or other system data for managing the storage device 20. The power management circuit is coupled to the processor 211 and configured to control power of the storage device 20.

In an embodiment, the storage controller 210 may record an array. An element in the array stores an index number of a block to be programmed after the logical to physical address mapping table is stored to the rewritable non-volatile memory module 220. As such, when abnormal power-off occurs, the storage controller 210 can read the index number recorded in the array without scanning all spare blocks to confirm the block to be programmed after the logical to physical address mapping table is stored to the rewritable non-volatile memory module 220. Nevertheless, if abnormal power-off occurs after one block begins to be programmed and a latest array information is not written into the rewritable non-volatile memory module 220 yet, all data to be written into the block is lost. To solve this problem, the storage controller 210 may perform the writing operation to the block after the array data is ensured to be written into the rewritable non-volatile memory module 220. Nevertheless, much time and resources are wasted in this way since a size of the index numbers of all of the blocks in the array is quite large.

Figure 2:
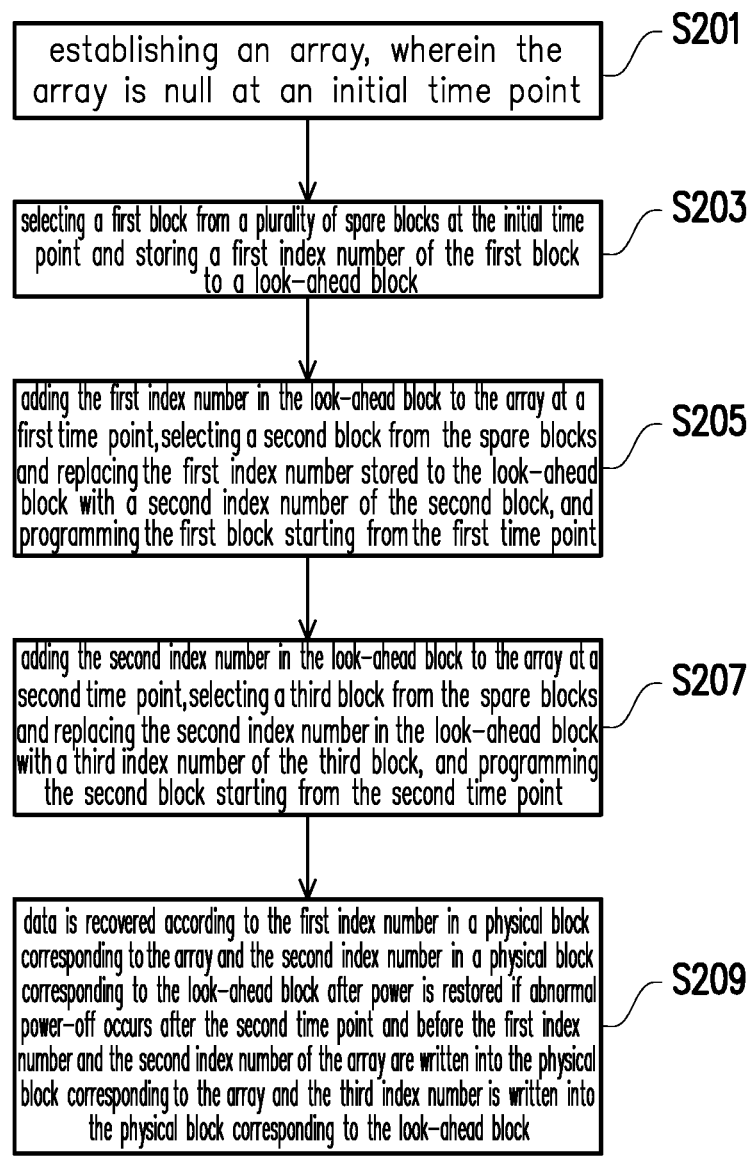
FIG. 2 is a flowchart of a memory management method according to an embodiment of the invention.
Figure 3:
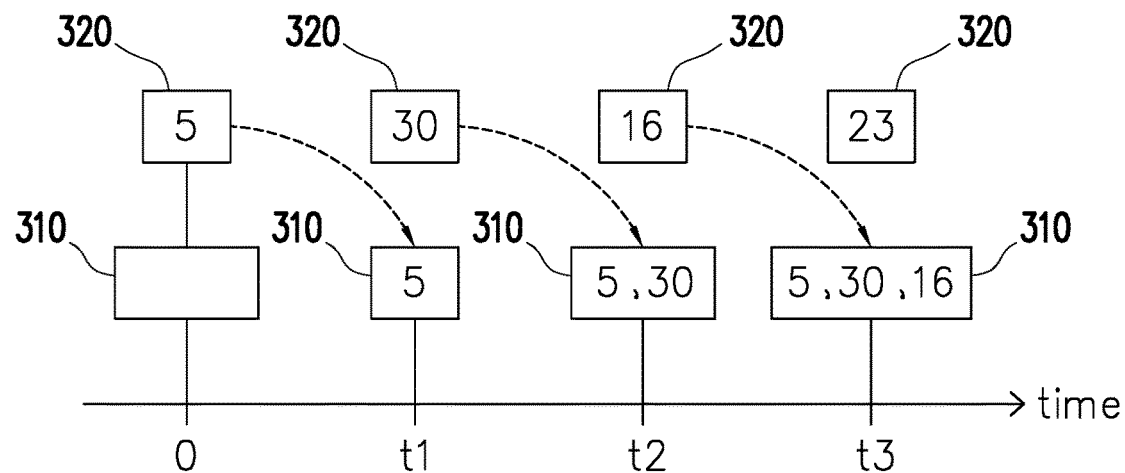
FIG. 3 is a schematic diagram of a memory management method according to an embodiment of the invention.
Figure 4:
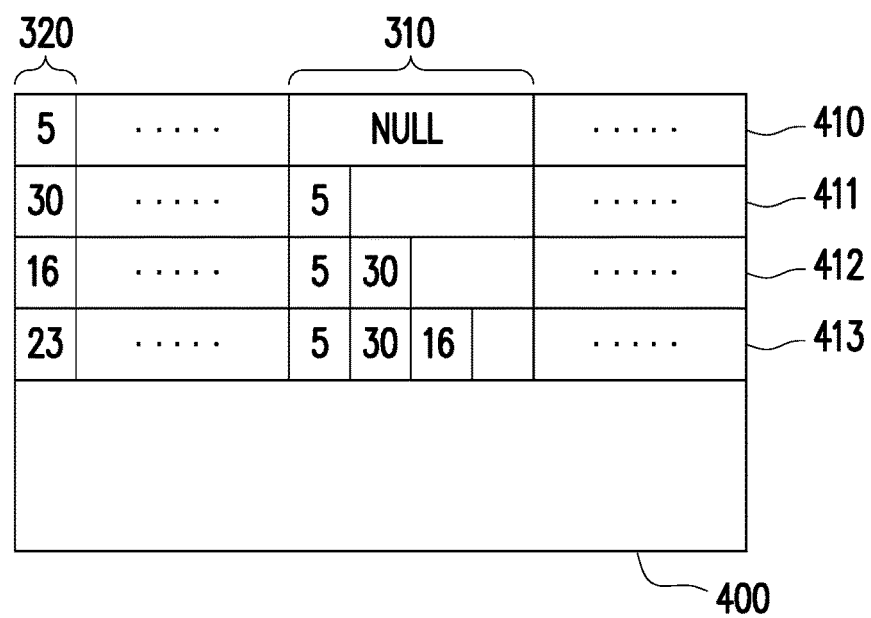
FIG. 4 is a schematic diagram of a blocking configured for storing an array according to an embodiment of the invention.

FIG. 2 is a flowchart of a memory management method according to an embodiment of the invention. FIG. 3 is a schematic diagram of a memory management method according to an embodiment of the invention. FIG. 4 is a schematic diagram of a blocking configured for storing an array according to an embodiment of the invention.

With reference to FIG. 2, in step S201, an array is established, wherein the array is null at an initial time point.

For instance, in FIG. 3 and FIG. 4, the storage controller 210 establishes an array 310 at a time point 0, and since the array 310 is null at this time, no data is stored to a zeroth page 410 (i.e., the physical page or the physical programming unit) configured for storing a physical block 400 of the array 310.

In step S203, a first block is selected from a plurality of spare blocks at the initial time point, and a first index number of the first block is stored to a look-ahead block.

For instance, in FIG. 3, the storage controller 210 selects a block 5 (i.e., the first block) from the spare blocks at the time point 0 and stores an index number 5 of the block 5 to a look-ahead block 320.

In step S205, the first index number in the look-ahead block is added to the array at the first time point. A second block is selected from the spare blocks, and the first index number stored to the look-ahead block is replaced with a second index number of the second block. The first block is programmed starting from the first time point.

For instance, in FIG. 3 and FIG. 4, the storage controller 210 adds the index number 5 in the look-ahead block 320 to the array 310 at a time point t1 and selects a block 30 (i.e., the second block) from the spare blocks. The index number 5 in the look-ahead block 320 is replaced with an index number 30 of the block 30. At this time, a first element of the array 310 is the index number 5, and the index number 5 is stored to a first page 411 of the physical block 400. The storage controller 210 programs the block 5 starting from the time point t1.

In step S207, the second index number in the look-ahead block is added to the array at a second time point. A third block is selected from the spare blocks, and the second index number stored to the look-ahead block is replaced with the third index number of the third block. The second block is programmed starting from the second time point.

For instance, in FIG. 3 and FIG. 4, the storage controller 210 adds the index number 30 in the look-ahead block 320 to the array 310 at a time point t2 and selects a block 16 (i.e., the third block) from the spare blocks. The index number 30 in the look-ahead block 320 is replaced with an index number 16 of the block 16. At this time, the first element and a second element of the array 310 respectively are the index number 5 and the index number 30, and the index number 5 and the index number 30 are stored to a second page 412 of the physical block 400. The storage controller 210 programs the block 30 starting from the time point t2.

In addition, the storage controller 210 adds the index number 16 in the look-ahead block 320 to the array 310 at a time point t3 and selects a block 23 from the spare blocks. The index number 16 in the look-ahead block 320 is replaced with an index number 23 of the block 23. At this time, the first element, the second element, and a third element of the array 310 respectively are the index number 5, the index number 30, and the index number 16, and the index number 5, the index number 30, and the index number 16 are stored to a third page 413 of the physical block 400. The storage controller 210 programs the block 16 starting from the time point t3.

Note that all of the pages of the block 5 are programmed between the time point t1 and the time point t2, and all of the pages of the block 30 are programmed between the time point t2 and the time point t3.

In step S209, if abnormal power-off occurs after the second time point and before the first index number and the second index number of the array are written into a physical block corresponding to the array and the third index number is written into a physical block corresponding to the look-ahead block, data is recovered according to the first index number in the physical block corresponding to the array and the second index number in the physical block corresponding to the look-ahead block after power is restored.

For instance, if abnormal power-off occurs after the time point t1, and the index number 30 in the look-ahead block 320 and the index number 5 in the array 310 are not fully written into the first page 411 of the physical block 400 yet when power is off, the storage controller 210 scans the block 5 according to the index number 5 stored to the look-ahead block 320 of the zeroth page 410 of the physical block 400 after power is restored to recover the user data.

For instance, if abnormal power-off occurs after the time point t2, and the index number 16 in the look-ahead block 320 and the index number 5 and the index number 30 in the array 310 are not written into the second page 412 of the physical block 400 yet when power is off, the storage controller 210 scans the block 5 and the block 30 according to the index number 5 stored to the array 310 of the first page 411 of the physical block 400 and the index number 30 of the look-ahead block 320 after power is restored to recover the user data.

In another aspect, if abnormal power-off occurs after the time point t3, and the index number 23 in the look-ahead block 320 and the index number 5, the index number 30, and the index number 16 in the array 310 are not written into the third page 413 of the physical block 400 yet when power is off, the storage controller 210 scans the block 5, the block 30, and the block 16 according to the index number 5 and the index number 30 stored to the array 310 of the first page 412 of the physical block 400 and the index number 16 of the look-ahead block 320 after power is restored to recover the user data.

It is worth noting that if abnormal power-off occurs at any time point, the storage controller acquires the data (i.e., index number of one or more blocks) in the array 310 and the look-ahead block 320 at the time point of the abnormal power-off to recover the user data.

In view of the foregoing, in the memory management method and the storage controller using the same provided by the embodiments of the invention, the index number of the block to be programmed in the time interval between the first time point and the second time point is added to one array at the first time point. Further, the index number of the block to be programmed at the second time point is recorded in one look-ahead block at the first time point. In this way, even though abnormal power-off occurs after the first time point and the latest array data of the first time point and the data of the look-ahead block are not written into the physical block yet, the controller may still recover the user data according to the array data of the time point prior to the first time point and the data of the look-ahead block without reading the block numbers of all of the blocks.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method, adapted for a storage device having a storage controller and a rewritable non-volatile memory module coupled to the storage controller, the storage controller having a processor, the method comprising:
    establishing an array in a system block of the rewritable non-volatile memory module by the processor, wherein the array is null at an initial time point;
    selecting a first block from a plurality of spare blocks of the rewritable non-volatile memory module at the initial time point and storing a first index number of the first block to a look-ahead block in the system block;
    adding the first index number in the look-ahead block to the array at a first time point, selecting a second block from the spare blocks and replacing the first index number in the look-ahead block with a second index number of the second block, and programming the first block starting from the first time point; and
    adding the second index number in the look-ahead block to the array at a second time point, selecting a third block from the spare blocks and replacing the second index number in the look-ahead block with a third index number of the third block, and programming the second block starting from the second time point.

2. The memory management method as claimed in claim 1, wherein data is recovered according to the first index number in a physical block corresponding to the array and the second index number in a physical block corresponding to the look-ahead block after power is restored if abnormal power-off occurs after the second time point and before the first index number and the second index number of the array are written into the physical block corresponding to the array and the third index number is written into the physical block corresponding to the look-ahead block.

3. The memory management method as claimed in claim 1, wherein the step of adding the first index number in the look-ahead block to the array at the first time point comprises: storing the first index number to a first element of the array and storing the array having the first index number to a first page of the physical block corresponding to the array; wherein the step of adding the second index number in the look-ahead block to the array at the second time point comprises: storing the second index number to a second element of the array and storing the array having the first index number and the second index number to a second page of the physical block corresponding to the array.

4. The memory management method as claimed in claim 1, wherein all physical pages of the first block are programmed in a time interval between the first time point and the second time point.

5. The memory management method as claimed in claim 1, wherein the first time point is later than the initial time point, and the second time point is later than the first time point.

6. A storage controller, configured for accessing a rewritable non-volatile memory module and coupled to a host system through a connection interface circuit, the storage controller comprising:
    a memory interface control circuit, configured for being coupled to the rewritable non-volatile memory module, wherein the rewritable non-volatile memory module comprises a plurality of physical blocks;
    a processor, coupled to the connection interface circuit and the memory interface control circuit; and
    a data transfer management circuit, coupled to the processor, the connection interface circuit, and the memory interface control circuit, wherein the processor is configured for
    establishing an array in a system block of the rewritable non-volatile memory module, wherein the array is null at an initial time point;
    selecting a first block from a plurality of spare blocks in the physical blocks at the initial time point and storing a first index number of the first block to a look-ahead block in the system block;
    adding the first index number in the look-ahead block to the array at a first time point, selecting a second block from the spare blocks and replacing the first index number in the look-ahead block with a second index number of the second block, and programming the first block starting from the first time point; and adding the second index number in the look-ahead block to the array at a second time point, selecting a third block from the spare blocks and replacing the second index number in the look-ahead block with a third index number of the third block, and programming the second block starting from the second time point.

7. The storage controller as claimed in claim 6, wherein the processor recovers data according to the first index number in a physical block corresponding to the array and the second index number in a physical block corresponding to the look-ahead block after power is restored if abnormal power-off occurs after the second time point and before the first index number and the second index number of the array are written into the physical block corresponding to the array and the third index number is written into the physical block corresponding to the look-ahead block.

8. The storage controller as claimed in claim 6, wherein the processor stores the first index number to a first element of the array and stores the array having the first index number to a first page of the physical block corresponding to the array, and the processor stores the second index number to a second element of the array and stores the array having the first index number and the second index number to a second page of the physical block corresponding to the array.

9. The storage controller as claimed in claim 6, wherein all physical pages of the first block are programmed in a time interval between the first time point and the second time point.

10. The storage controller as claimed in claim 6, wherein the first time point is later than the initial time point, and the second time point is later than the first time point.

* * * * *